US008770602B1

(12) United States Patent
Belleau

(10) Patent No.: US 8,770,602 B1
(45) Date of Patent: Jul. 8, 2014

(54) STEERING LINKAGE AND METHOD FOR PRODUCING SAME

(75) Inventor: Ryan Mark Belleau, St. Catharines (CA)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 13/468,165

(22) Filed: May 10, 2012

Related U.S. Application Data

(60) Provisional application No. 61/484,337, filed on May 10, 2011.

(51) Int. Cl.
B62D 7/16 (2006.01)

(52) U.S. Cl.
USPC ...................................... 280/93.51

(58) Field of Classification Search
USPC ............................ 280/93.51, 93.511, 86.758
See application file for complete search history.

(56) References Cited

U.S. PATENT DOCUMENTS

| | | | | |
|---|---|---|---|---|
| 1,935,521 A | * | 11/1933 | Piotrowski | 280/89.12 |
| 3,498,652 A | * | 3/1970 | Cass | 403/43 |
| 3,525,533 A | * | 8/1970 | Mazur | 280/93.511 |
| 3,547,460 A | * | 12/1970 | Gottschald | 280/93.511 |
| 3,583,052 A | * | 6/1971 | Herbenar et al. | 29/896.7 |
| 3,938,822 A | * | 2/1976 | Guerriero | 280/86.758 |
| 4,162,859 A | * | 7/1979 | McAfee | 403/75 |
| RE31,013 E | * | 8/1982 | Smith, Jr. | 403/27 |
| 4,614,451 A | * | 9/1986 | Braisted, Jr. | 403/14 |
| 5,004,367 A | * | 4/1991 | Wood, Jr. | 403/46 |
| 5,104,136 A | * | 4/1992 | Buhl et al. | 280/93.5 |
| 5,529,316 A | * | 6/1996 | Mattila | 280/93.51 |
| 6,074,125 A | * | 6/2000 | Krawczak | 403/374.3 |
| 6,089,779 A | * | 7/2000 | Lancelot, III | 403/313 |
| 6,102,416 A | * | 8/2000 | Harkrader et al. | 280/93.515 |
| 6,386,564 B1 | * | 5/2002 | Kincad et al. | 280/93.51 |
| 6,520,709 B1 | * | 2/2003 | Mosing et al. | 403/305 |
| 6,561,715 B2 | * | 5/2003 | Wasylewski et al. | 403/71 |
| 6,612,594 B2 | * | 9/2003 | Engels et al. | 280/93.502 |
| 6,666,467 B2 | * | 12/2003 | Bernhardt | 280/93.51 |
| 7,182,544 B2 | * | 2/2007 | Irrer | 403/43 |
| 7,185,556 B2 | * | 3/2007 | Beattie | 74/586 |
| 7,201,530 B2 | * | 4/2007 | Wappes et al. | 403/27 |
| 7,204,497 B2 | * | 4/2007 | Bergman | 280/93.511 |
| 7,416,198 B2 | * | 8/2008 | Blaszynski | 280/89.12 |
| 7,547,028 B1 | * | 6/2009 | Blaszynski et al. | 280/93.51 |
| 7,788,993 B2 | * | 9/2010 | Wood | 74/579 R |
| 7,850,178 B2 | * | 12/2010 | Fischer et al. | 280/86.758 |
| 7,914,023 B2 | * | 3/2011 | Zaloga et al. | 280/93.511 |
| 2002/0149158 A1 | * | 10/2002 | Havercamp et al. | 277/634 |

* cited by examiner

*Primary Examiner* — Nicole Verley
(74) *Attorney, Agent, or Firm* — MacMillan, Sobanski & Todd, LLC

(57) ABSTRACT

An improved structure for a steering linkage adapted for use in a vehicle steering system and method for producing the same. According to one embodiment, the steering linkage includes a first member having a first longitudinal axis, a second member having a second longitudinal axis, and a third member operatively coupling together the first member and the second member together with the first and second longitudinal axes in alignment with each other.

15 Claims, 5 Drawing Sheets

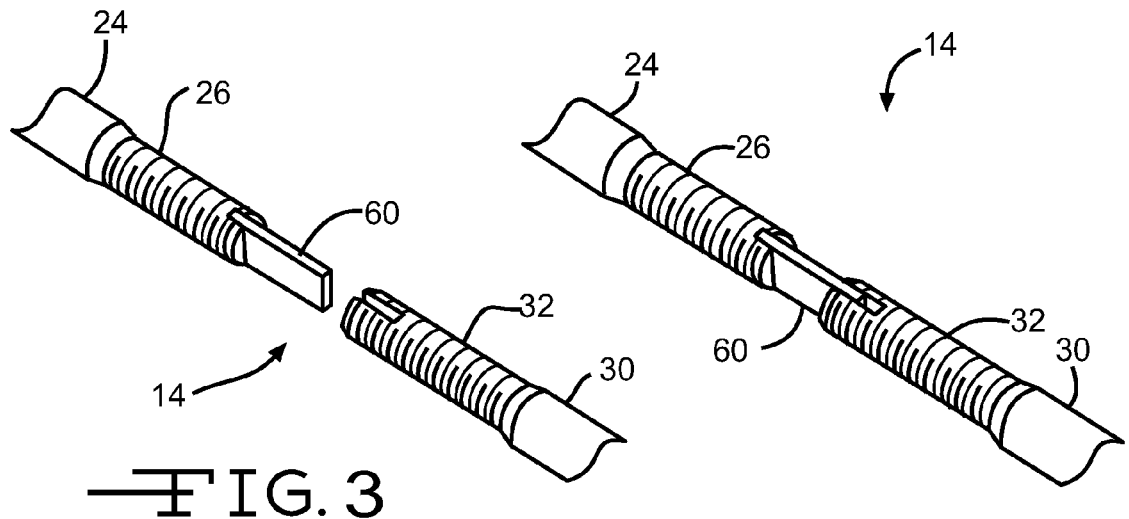
FIG. 3
FIG. 4
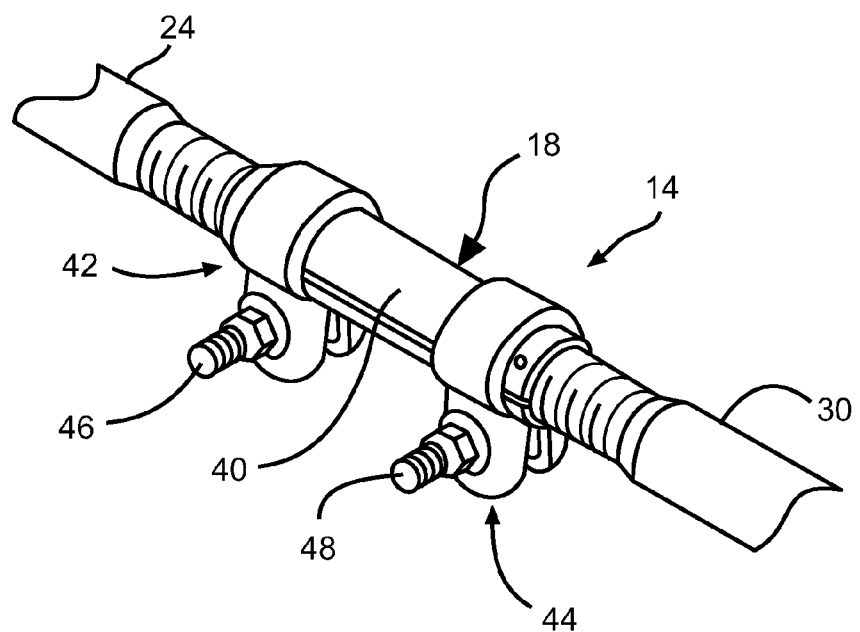
FIG. 5

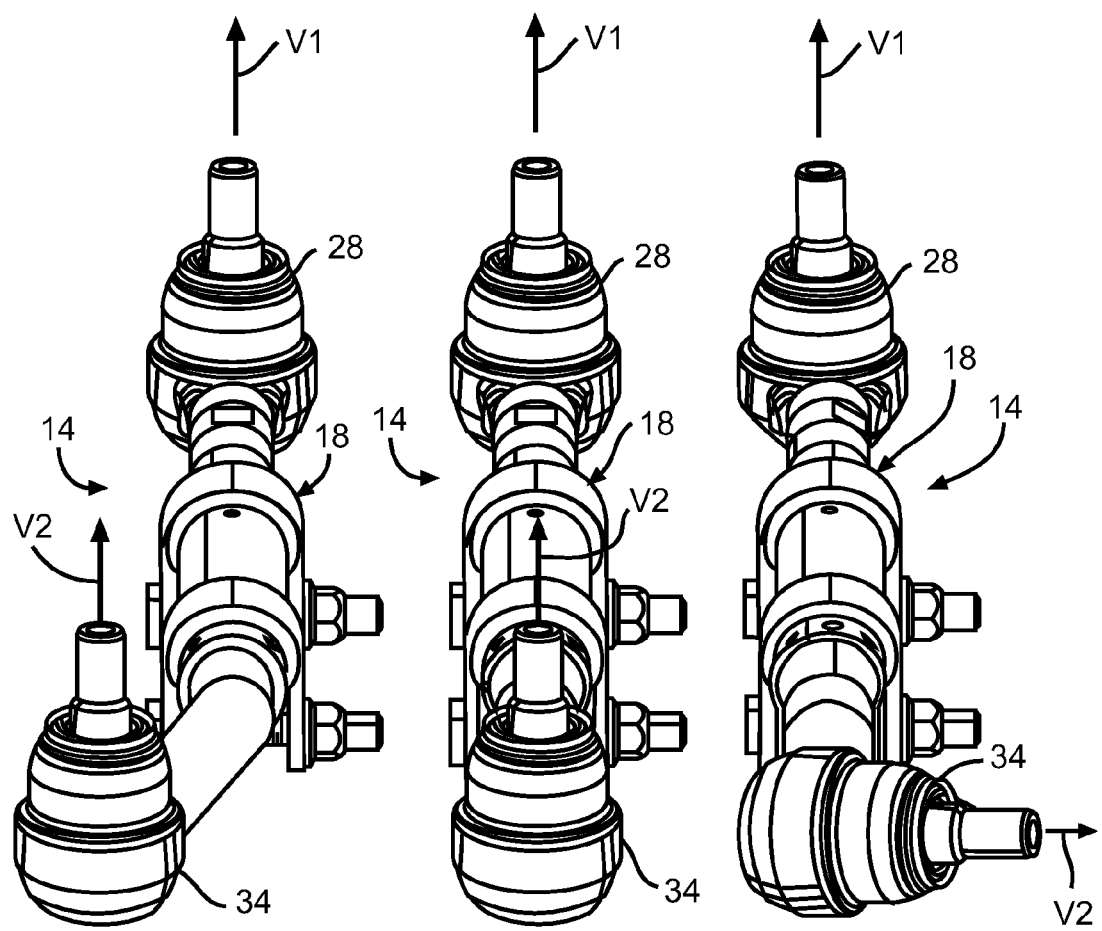

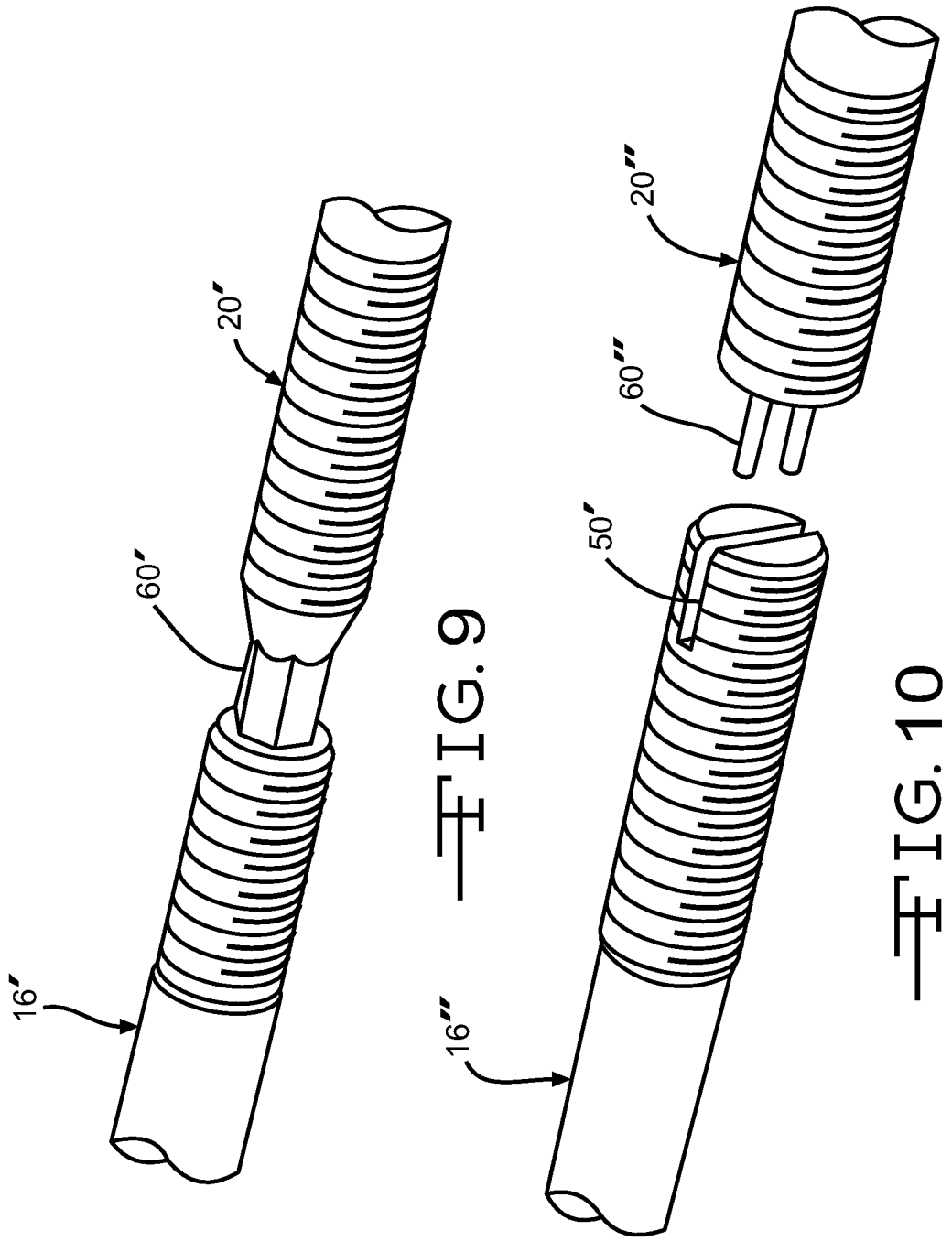

STEERING LINKAGE AND METHOD FOR PRODUCING SAME

CROSS-REFERENCE TO RELATED APPLICATIONS

This application claims the benefit of U.S. Provisional Application Ser. No. 61/484,337, filed May 10, 2011, the disclosure of this application incorporated herein by reference in entirety.

BACKGROUND OF THE INVENTION

This invention relates in general to vehicle steering systems and in particular to an improved steering linkage for use in such vehicle steering systems and method for producing the same.

Automotive vehicle steering and suspension systems are well known and are used to steer the front wheels as well as support the vehicle while providing a smooth ride. Typically, a steering linkage of the steering system includes a drag link assembly (also sometimes called a tie rod assembly, depending upon the particular steering linkage configuration). The drag link assembly typically includes an inner drag link rod and an outer drag link rod which are coupled together by a drag link adjuster. At the opposed ends of the rods of the drag links, there is provided a socket or pocket for receiving a ball joint. During the assembly process, the drag link adjuster is operative to adjust the distance between the sockets, and therefore the ball joints, to a predetermined distance. Following adjustment, the drag link adjuster is secured in place via a pair of clamps. Such a steering system having a steering linkage drag link assembly is disclosed in U.S. Pat. No. 7,416,198 B2 to Blaszynski, the disclosure of this patent incorporated by reference herein in entirety.

SUMMARY OF THE INVENTION

This invention relates to an improved steering linkage for use in a vehicle steering system and method for producing the same According to one embodiment, the vehicle steering linkage comprises: a first member having a first end and a second end; a second member having a first end and a second end; and a third member operatively coupling together the first member and the second member together at the first ends thereof, wherein the third member couples together the first ends in a predetermined orientation relative to one another to thereby position the second ends in a predetermined orientation relative to one another.

According to this embodiment of the vehicle steering linkage, the first ends include openings formed therein and the third member is configured to be disposed in the openings According to this embodiment of the vehicle steering linkage, the third member is fixed in one of the openings of the first ends and is non-fixed in the other one of the openings of the first ends.

According to this embodiment of the vehicle steering linkage, there is further provided an adjuster mechanism operatively disposed about the first ends of the first and second members.

According to this embodiment of the vehicle steering linkage, the second ends of the first and second members are oriented in a parallel configuration relative to one another.

According to this embodiment of the vehicle steering linkage, the second ends of the first and second member are oriented in a non-parallel configuration relative to one another.

According to this embodiment of the vehicle steering linkage, the first and second members are drag link assemblies have ball joints operatively disposed in the second ends thereof.

According to this embodiment of the vehicle steering linkage, there is further provided a drag link adjuster which is configured to allow a distance defined between the second ends of the first and second members to be adjusted relative to one another.

According to this embodiment of the vehicle steering linkage, the third member is an alignment member having opposed ends, the opposed ends of the alignment member are configured to be disposed in complimentary shaped openings provided in the first ends of the first and second members.

According to another embodiment, the vehicle steering linkage third member is formed integral at one of the first ends of the first and second members.

According to another embodiment, the vehicle steering linkage third member is non-fixed in at least one of the openings of the first ends.

According to another embodiment, the vehicle steering linkage third member is non-fixed in both of the openings of the first ends.

According to another embodiment, the vehicle steering linkage comprises: a first member having a first end and a second end, the first end provided with an opening formed therein and the second end configured to support a first ball joint; a second member having a first end and a second end, the first end provided with an opening formed therein and the second end configured to support a second ball joint; and an alignment member disposed within the openings provided in the first ends of the first and second members to thereby operatively couple together the first and second members in a predetermined orientation relative to one another and thereby position the first and second ball joints in a predetermined orientation relative to one another.

According to this embodiment of the vehicle steering linkage, the alignment member is fixed in one of the openings of the first ends and is non-fixed in the other one of the openings of the first ends.

According to this embodiment of the vehicle steering linkage, the openings are identical to one another.

According to this embodiment of the vehicle steering linkage, there is further provided a drag link adjuster operatively disposed about the first ends of the first and second members.

According to this embodiment of the vehicle steering linkage, the alignment member couples together the first and second members in a predetermined orientation relative to one another which is operative to position the first and second ball joints in a parallel configuration relative to one another.

According to this embodiment of the vehicle steering linkage, the alignment member couples together the first and second members in a predetermined orientation relative to one another which is operative to position the first and second ball joints in a non-parallel configuration relative to one another.

According to this embodiment of the vehicle steering linkage, the alignment member has opposed ends complimentary to a shape of the openings provided in the first ends of the first and second members.

According to another embodiment, a method of assembly of a vehicle steering linkage comprises the steps of: (a) providing a first member having a first end and a second end; (b) providing a second member having a first end and a second end; and (c) providing a third member configured to operatively couple together the first member and the second member together at the first ends thereof, wherein the third member couples together the first ends in a predetermined orientation relative to one another to thereby position the second ends in a predetermined orientation relative to one another.

According to this embodiment, in the step (c) the alignment member is non-fixed to at least one of first and second members, and the method further includes the step of providing an adjustment mechanism which is configured to be operatively disposed about the first ends of the first and second members, wherein the adjustment mechanism is configured to allow a distance defined between the second ends of the first and second members to be adjusted relative to one another while the alignment member maintains the first and second ball ends in the predetermined orientation relative to one another.

According to this embodiment, the first ends include openings formed therein and the third member is configured to be disposed in the openings.

Other advantages of this invention will become apparent to those skilled in the art from the following detailed description of the preferred embodiments, when read in light of the accompanying drawings.

BRIEF DESCRIPTION OF THE DRAWINGS

FIG. 3 is another view of the portion of the steering linkage showing an initially partially assembled condition, without a clamp mechanism.

FIG. 4 is another view of the portion of the steering linkage showing a further assembled condition, without the clamp mechanism.

FIG. 5 is another view of the portion of the steering linkage showing the clamp mechanism installed.

FIG. 6 is a view of a portion of a vehicle steering system having the steering link of the present invention installed thereon.

FIG. 7 is a view similar to FIG. 6 but showing a portion of another vehicle steering system having the steering link of the present invention installed thereon.

FIG. 8 is view similar to FIG. 6 but showing a portion of yet another vehicle steering system having the steering link of the present invention installed thereon.

FIG. 9 is a view similar to FIG. 2 showing another embodiment of a portion of a vehicle steering system having an improved steering linkage in accordance with the present invention.

FIG. 10 is a view similar to FIG. 9 showing yet another embodiment of a portion of a vehicle steering system having an improved steering linkage in accordance with the present invention.

DETAILED DESCRIPTION OF THE PREFERRED EMBODIMENTS

Figure 1:
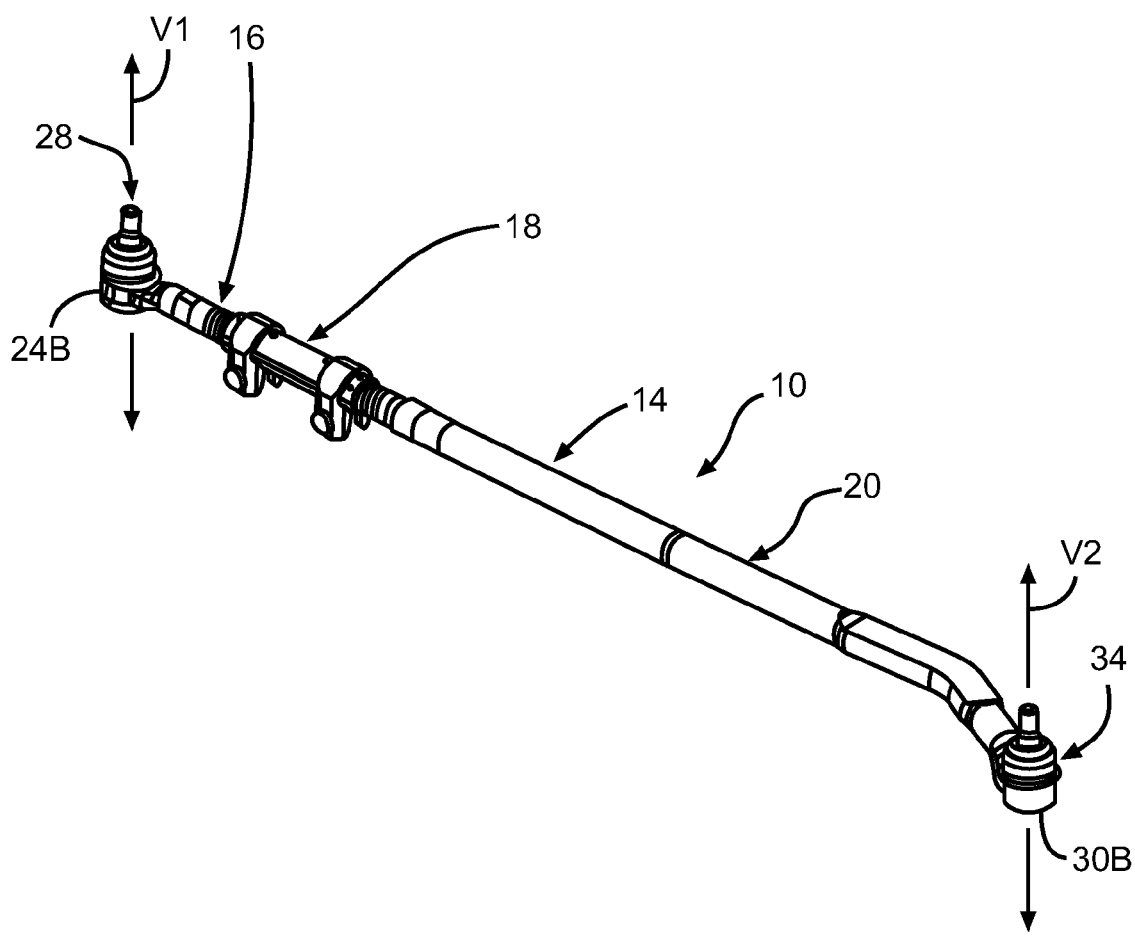
FIG. 1 is a perspective view of an embodiment of a portion of a vehicle steering system having an improved steering linkage in accordance with the present invention.

Referring now to the drawings, there is FIG. 1 a portion of a portion of a steering linking, indicated generally at 10, of a vehicle steering system in accordance with the present invention. The general structure and operation of the steering linkage 10 is conventional in the art and thus, only those portions of the steering linkage 10 which are necessary for a full understanding of this invention will be explained and illustrated. Although the invention will be described and illustrated in connection with the particular kind of prior art steering linkage disclosed herein, it will be appreciated that the invention may be used in connection with other kinds of vehicle steering linkage structures, such as for example U.S. Pat. No. 7,416,198 B2 to Blaszynski, the disclosure of this patent incorporated herein by reference in entirety, if so desired.

As shown in FIG. 1, in the illustrated embodiment the steering linkage 10 includes a drag link assembly 14, which is comprised of a first member or outer drag link socket assembly 16, an adjuster mechanism or drag link adjuster 18, and a second member or main drag link socket assembly 20. The drag link assembly 14 is also sometimes called a tie rod assembly, depending upon the particular type of steering linkage, so when the term "drag link" is used herein, this can also includes a tie rod.

In the illustrated embodiment, the outer drag link socket assembly 16 includes an "outer" rod portion 24, with adjustment threads 26 at a first or inner end 24A thereof, and a first ball joint 28 at an opposite second or outer end 24B thereof. The first ball joint 28 is disposed in a pocket or opening (not shown) provided in the outer end 24B thereof. The first ball joint 28 may be connected to a steering knuckle (not shown) of the associated vehicle steering or suspension system. As will be discussed below, the adjustment threads 26 engage with the drag link adjuster 18.

In the illustrated embodiment, the rod portion 24 generally defines a first longitudinal or "horizontal" axis H1 and the first ball joint defines a first or "vertical" axis V1. In the illustrated embodiment, first vertical axis V1 is oriented or positioned generally perpendicular to the first horizontal axis H1. Alternatively, the orientation of one or both of the axes V1 and H1 can be other than illustrated if so desired.

In the illustrated embodiment, the main drag link socket assembly 20 includes a "main" rod portion 30, with adjustment threads 32 at a first or inner end 30A thereof, and a second ball joint 34 mounted in an opening or pocket (not shown) at a second or outer end 30B thereof. Preferably, the rod portion 30 is a solid rod. The second ball joint 34 may be connected to a steering knuckle (not shown) of the associated vehicle steering or suspension system if so desired. In the illustrated embodiment, the outer end 30B is curved or angled relative to the remainder of the rod portion 30. Alternatively, as shown in FIG. xx, the rod portion 30 could be entirely straight such that the inner end 30A and the outer end 30B are in alignment with one another. As will be discussed below, the adjustment threads 32 engage with the drag link adjuster 18.

In the illustrated embodiment, the rod portion 30 generally defines a second longitudinal or "horizontal" axis H2 and the first ball joint 34 defines a second or "vertical" axis V2. In the illustrated embodiment, the second vertical axis V2 is oriented or positioned perpendicular to the second horizontal axis H2. In the illustrated embodiment, the second vertical axis V2 is oriented in an offset but parallel configuration relative to the first vertical axis V1 thereby aligning the ball joints 28 and 34 in an offset parallel configuration with one another as shown in FIG. 6. Alternatively, the orientation of the rod portions 24 and 30, and therefore the orientation of the associated ball joints 28 and 34, can be other than illustrated if so desired in accordance with the present invention.

For example, as shown in FIG. 7, the second axis V2 of the ball joint 34 can be oriented parallel in alignment with the first axis V1 of the ball joint 28. Also, as shown in FIG. 8, the second axis V2 of the ball joint 34 can be oriented at an angle relative to the first axis V1 of the ball joint 28. In this embodiment, the axis V2 is oriented generally perpendicular to the axis V1. Thus, in accordance with the present invention, the rod portions 24 and 30 can be oriented relative to one another in any desired position whereby the ball joints 28 and 34 coupled thereto are oriented in a desired position relative to one another. In broader terms, the present invention can be utilized in any desired vehicle steering or suspension system wherein it is desired to connect together two or more members of the steering linkage (or similar members together), such that the ball joints (or other suitable members) at the opposed ends thereof are oriented or located in a desired position relative to one another (i.e., in a parallel configuration or at a desired angle relative to one another).

Figure 2:
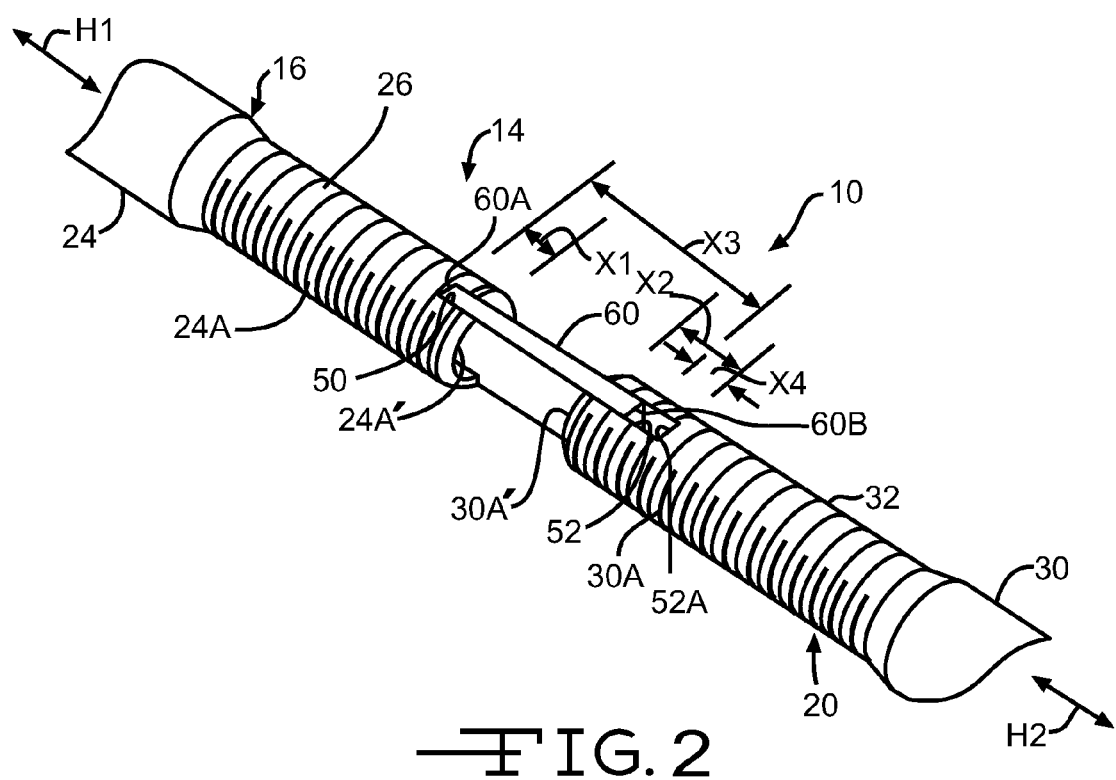
FIG. 2 is an enlarged view of a portion of the steering linkage illustrated in FIG. 1.

As best shown in FIG. 2, in the illustrated embodiment, the inner end 24A of the rod portion 24 is provided with a longitudinal pocket, key, opening or "alignment" slot 50 formed therein extending inwardly from a remote end 24A' thereof. The slot 50 extends a predetermined distance or length X1 into at least the inner end 24A of the rod portion 24 from the remote end 24A' thereof.

Similarly, in the illustrated embodiment as shown in FIG. 2, the inner end 30A of the rod portion 30 is provided with a longitudinal pocket or key or "alignment" slot 52 formed therein extending inwardly therein from a remote end 30A' thereof. The slot 52 extends a predetermined distance or length X2 into at least the inner end 30A of the rod portion 30 from the remote end 30A' thereof. In the illustrated embodiment, the slots 50 and 52 are preferably of the same shape or configuration. Alternatively, the slots 50 and 52 can be formed different from one another if so desired.

In the illustrated embodiment, the drag link assembly 14 of the steering linkage 10 further includes a third "alignment" member or plate 60, as shown in FIG. 2. In the illustrated embodiment, the member 60 is shaped complimentary to the shape of the slots 50 and 52 and is a generally flat rectangular plate having a predetermined length X3. The plate 60 includes a first end 60A and an opposite second end 60B.

In the illustrated embodiment, the first end 60A of the plate 60 is preferably fully inserted into the slot 50 of the rod portion 24 against the inner end of the slot 50 and is preferably secured or fixed therein with no gap between the first end 60A of the plate 60 and the inner end of the slot 50. The plate 60 can be secured to the rod portion 24 by any suitable method or means, such as for example by press-fitting, pinning, welding, gluing, or the like.

In the illustrated embodiment, the opposite second end 60B of the plate 60 is aligned in the slot 52 of the rod portion 30 in a slip fit therewith and with a predetermined "adjustment" clearance or distance X4 between the second end 60B and an end 52A of the slot 52. The clearance or distance X4 is preferably provided in use to allow for minimum and maximum adjustability of the rod portions 24 and 30 of the associated vehicle steering or suspension system. Alternatively, the plate 60 can be fixed in the slot 52 of the rod portion 30 and non-fixed in a slip fit therewith in the slot 50 of the rod portion 24, and/or the plate 60 can be non-fixed in both the slots 50 and 52 of the rod portions 24 and 30, respectively, if so desired.

In the illustrated embodiment, the drag link adjuster 18 is of a "turnbuckle" design and includes an adjuster sleeve 40, a first or outer adjuster bracket 42, and a second or inner adjuster bracket 44, as best shown in FIG. 5. The adjuster sleeve 40 has a first set of "right hand" internal threads, not shown, that engage with the adjustment threads 26 on the outer drag link socket assembly 16, and a second set of "left hand" internal threads, not shown, that engage with adjustment threads 32 on the main drag link socket assembly 20. The internal threads of the adjuster sleeve 30 engage with the corresponding adjustment threads 26 and 32 of the rod portion 24 of the outer drag link socket assembly 16 and the rod portion 30 of the main drag link socket assembly 20, so that when the adjuster sleeve 40 is rotated in one direction, the length of the drag link assembly 14 will decrease, and when rotated in the opposite direction, the length of the drag link assembly 14 will increase. Alternatively, the construction, type or configuration of the drag link adjuster 18 can be other than illustrated and described if so desired.

In the illustrated embodiment, the outer adjuster bracket 42 mounts over an outer end of the adjuster sleeve 40 and includes a first bolt and nut or clamp assembly 46, while the inner adjuster bracket 44 mounts over the inner end of the adjuster sleeve 40 and includes a second bolt and nut or clamp assembly 48. During the assembly process, when the clamp assemblies 46 and 48 are tightened on the brackets 42 and 44, respectively, they secure the internal threads of the adjuster sleeve 40 relative to the adjustment threads 26 and 32. As will be discussed below, during this assembly process the present invention is operative to ensure that the orientation or position of the horizontal axes H1 and H2 of the outer drag link socket assembly 16 and the main drag link socket assembly 20, respectively are aligned in a predetermined orientation with each other, and therefore that the vertical axis V1 of the first ball joint 28 is oriented or aligned in a predetermined orientation relative to the vertical axis V2 of the second ball joint 34, prior to securement in such position via the tightening of the bolt and nut assemblies 46 and 48.

In use, the adjuster mechanism 18 allows the pre-aligned or pre-oriented rod portions 24 and 30 of the respective first and second members 16 and 20 to be adjusted or moved to a desired final adjusted position via turning or rotating the tube 40 to either move the members 16 and 20 toward each other or apart from each other depending upon the direction of rotation of the tube 40. Once the position of the members 16 and 20 are adjusted to their final position, the tube 40 is tightened via the clamp assemblies 46 and 48 to squeeze the tube 40 around the threads 24 and 34 of the members 16 and 20, respectively, thereby securing the members 16 and 20 in such position. Alternatively, the structure, configuration, and/or shape of one or more of the first member 16, the second member 20 and the third member 60 of the embodiment of the steering linkage 10 can be other than illustrated and described if so desired.

For example, the third member 60 can have any other suitable desired geometric shape, such as for example, triangular, rectangular, square, diamond, hexagonal, so as to be configured to be operatively disposed in correspondingly (or non-correspondingly) shaped slots or openings provided in the first member 16 and second member 20 to thereby secure such members in a desired position relative to one another.

Also, in the illustrated embodiment, the plate 60 is shown as being separate plate, i.e., not part of the first member 16 or the second member 20. However, the plate 60 can be formed as part of the first member 16 or the second member 20 at an associated end thereof by a suitable process, such as machining a plate or other desired shaped member formed thereon preferably during the manufacturing of the associated member 16 or 20, if so desired.

For example, as shown in the embodiment illustrated in FIG. 9, a second member 20' can have an integrally formed third or alignment member 60' provided thereon at an end thereof. In this embodiment, the third member 60' is hex-shaped and a first member 16' includes a similar hex-shaped opening provided therein. Also, as shown in FIG. 10, a second member 20" can have a pair of pin-shaped third members 60" provided thereon at an end thereof. In this embodiment, the third members 60" are received in opening 50' provided in a first member 16". As can be seen, the shape of the opening 50' is not identical to the shape of the third members 60".

Also, the method for aligning and/or the mechanism for adjusting and/or coupling the first member 16 and the second member 20 together can be other than illustrated and described if so desired.

One potential advantage of the embodiment of the steering linkage 10 of the present invention is that it functions or operates to ensure and provide for the proper alignment, position or orientation of the first member 16 and the second member 20 to each other (i.e., the axes H1 and H2 and therefore the axes V1 and V2), during drag link (or tie rod) length adjustment (as shown in FIG. 6 with the axes V1 and V2 being in offset but parallel alignment), to prevent the length of associated tie rods thereof from being set with the socket studs S1 and S2 thereof at opposing windows or in non-alignment with each other. As a result of this, the present invention prevents or reduces the possibility of the ball studs 28 and 34 from being broken following assembly as they self-center at the first right/left jounce/rebound movement of the vehicle steering and suspension system.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle steering linkage comprising:
    a first member having a threaded first end and a second end;
    a second member having a threaded first end and a second end; and
    only a one piece third member is utilized for operatively coupling together the first member and the second member together at the first ends thereof, wherein the third member couples together the first ends in a predetermined orientation relative to one another to thereby position the second ends in a predetermined orientation relative to one another;
    wherein the threaded first ends of the first and second members each has a radially extending slot formed through at least a portion of the threads of the threaded first end thereof, each of the slots terminating in a closed inner end surface;
    wherein the third member is a non-yielding member separate and distinct from the first and second members and has a first end and an opposite second end;
    wherein the first end of the third member is fully inserted into one of the slots of the first and second members in contact with the closed inner end surface of the one of the slots and is secured therein in a fixed manner therein with no gap between the first end of the third member and the closed inner end surface of the one of the slots of the first and second members; and
    wherein the second end of the third member is disposed in a slip-fit manner in the other one of the slots of the first and second members and with the second end of the third member spaced apart from contact with the closed inner end surface of the other one of the first and second slots of the first and second members by a predetermined clearance distance to allow for adjustability of the first and second members.

2. The vehicle steering linkage of claim 1 wherein the second ends of the first and second members are oriented in a parallel configuration relative to one another.

3. The vehicle steering linkage of claim 1 wherein the second ends of the first and second member are oriented in a non-parallel configuration relative to one another.

4. The vehicle steering linkage of claim 1 wherein the first and second members are drag link assemblies having ball joints operatively disposed in the second ends thereof.

5. The vehicle steering linkage of claim 4 further including a drag link adjuster, wherein the drag link adjuster is configured to allow a distance defined between the second ends of the first and second members to be adjusted relative to one another.

6. The vehicle steering linkage of claim 1 wherein the third member is an alignment member disposed in complimentary shaped openings slots provided in the threaded first ends of the first and second members.

7. A vehicle steering linkage comprising:
    a first member having a threaded first end and a second end, the threaded first end provided with a radially extending slot formed through at least a portion of the threads of the threaded first end thereof and the second end configured to support a first ball joint;
    a second member having a threaded first end and a second end, the threaded first end provided with a radially extending slot formed through at least a portion of the threads of the threaded first end thereof and the second end configured to support a second ball joint; and
    only a one-piece alignment member is disposed within the slots provided in the threaded first ends of the first and second members to thereby operatively couple together the first and second members in a predetermined orientation relative to one another and thereby position the first and second ball joints in a predetermined orientation relative to one another;
    wherein each of the slots provided in the threaded first ends of the first and second members terminates in a closed inner end surface;
    wherein the alignment member is a non-yielding member separate and distinct from the first and second members and has a first end and an opposite second end;
    wherein the first end of the third member is fully inserted into one of the slots of the first and second members in contact with the closed inner end surface of the one of the slots and is secured therein in a fixed manner and therein with no gap between the first end thereof the third member and the closed inner end surface of the one of the openings slots of the first and second members; and
    wherein the second end of the third member is disposed in a slip-fit manner in the other one of the slots of the first and second members and with the second end the third member spaced apart from contact with the closed inner end surface of the other one of the first and second slots of the first and second members by a predetermined clearance distance to allow for adjustability of the first and second members.

8. The vehicle steering linkage of claim 7 wherein the slots are identical to one another.

9. The vehicle steering linkage of claim 7 further including a drag link adjuster operatively disposed about the first ends of the first and second members.

10. The vehicle steering linkage of claim 7 wherein the alignment member couples together the first and second members in a predetermined orientation relative to one another which is operative to position the first and second ball joints in a parallel configuration relative to one another.

11. The vehicle steering linkage of claim 7 wherein the alignment member couples together the first and second members in a predetermined orientation relative to one another which is operative to position the first and second ball joints in a non-parallel configuration relative to one another.

12. The vehicle steering linkage of claim 7 wherein the first and second ends of the alignment member are shaped complimentary to a shape of the slots provided in the threaded first ends of the first and second members.

13. A method of assembly of a vehicle steering linkage comprising the steps of:
 (a) providing a first member having a threaded first end and a second end;
 (b) providing a second member having a threaded first end and a second end; and
 (c) providing only a one piece third member configured to operatively couple together the first member and the second member together at the first ends thereof, wherein the third member couples together the first ends in a predetermined orientation relative to one another to thereby position the second ends in a predetermined orientation relative to one another;
 wherein the threaded first ends of the first and second members each has a radially extending slot formed through at least a portion of the threads of the threaded first end thereof, each of the slots terminating in a closed inner end surface;
 wherein in the step (c) the third member is a non-yielding member separate and distinct from the first and second members and has a first end and an opposite second end;
 wherein in the step (c) the first end of the third member is fully inserted into one of the slots of the first and second members in contact with the closed inner end surface of the one of the slots and is secured therein in a fixed manner therein with no gap between the first end of the third member and the closed inner end surface of the one of the slots of the first and second members; and
 wherein in the step (c) the second end of the third member is disposed in a slip-fit manner in the other one of the slots of the first and second members and with the second end of the third member spaced apart from contact with the closed inner end surface of the other one of the first and second slots of the first and second members by a predetermined clearance distance to allow for adjustability of the first and second members.

14. The method of claim 13 and further including the step of providing an adjustment mechanism which is configured to be operatively disposed about the threaded first ends of the first and second members, wherein the adjustment mechanism is configured to allow a distance defined between the second ends of the first and second members to be adjusted relative to one another while the alignment member maintains the first and second ball ends in the predetermined orientation relative to one another.

15. The method of claim 13 wherein the first and second ends of the third member are shaped complimentary to a shape of the slots provided in the threaded first ends of the first and second members.

* * * * *

UNITED STATES PATENT AND TRADEMARK OFFICE
CERTIFICATE OF CORRECTION

PATENT NO. : 8,770,602 B1
APPLICATION NO. : 13/468165
DATED : July 8, 2014
INVENTOR(S) : Ryan Mark Belleau Page 1 of 1

It is certified that error appears in the above-identified patent and that said Letters Patent is hereby corrected as shown below:

In the Claims:

Column 8, Claim 6, Line 14, delete "openings".

Signed and Sealed this
Seventh Day of October, 2014

Michelle K. Lee
*Deputy Director of the United States Patent and Trademark Office*